United States Patent [19]

Thaler et al.

[11] 4,153,584

[45] May 8, 1979

[54] HIGH MOLECULAR WEIGHT HIGH UNSATURATION $C_4$-$C_{10}$ ISOOLEFIN CONJUGATED DIOLEFIN COPOLYMERS AND MULTIPOLYMERS CONTAINING METHYLCYCLOPENTADIENE

[75] Inventors: Warren A. Thaler, Matawan; Donald J. Buckley, Plainfield, both of N.J.; Joseph P. Kennedy, Akron, Ohio

[73] Assignee: Exxon Research & Engineering Co., Florham Park, N.J.

[21] Appl. No.: 898,473

[22] Filed: Apr. 20, 1978

Related U.S. Application Data

[60] Division of Ser. No. 787,366, Apr. 14, 1977, which is a continuation-in-part of Ser. No. 631,444, Nov. 13, 1975, Pat. No. 4,031,300, which is a continuation-in-part of Ser. No. 457,109, Apr. 1, 1974, Pat. No. 3,928,297, which is a continuation-in-part of Ser. No. 151,038, Jun. 8, 1971, Pat. No. 3,808,177.

[51] Int. Cl.² .................. C08C 19/30; C08J 3/24; C08K 5/36
[52] U.S. Cl. .................. 260/5; 260/31.8 DR; 260/33.6 AQ; 260/42.47; 260/888; 260/889; 526/36
[58] Field of Search .......... 260/5, 31.8 DR, 33.6 AQ, 260/42.47, 888, 889; 526/36

[56] References Cited

U.S. PATENT DOCUMENTS

| | | | |
|---|---|---|---|
| 2,521,359 | 9/1950 | Garber | 260/85.3 |
| 3,080,337 | 3/1963 | Minckler et al. | 260/45.5 |
| 3,808,177 | 4/1974 | Thaler et al. | 260/80.7 |
| 3,928,297 | 12/1975 | Thaler et al. | 260/85.3 A |

*Primary Examiner*—Stanford M. Levin
*Attorney, Agent, or Firm*—Richard E. Nanfeldt

[57] ABSTRACT

Substantially gel-free high unsaturation copolymers of isobutylene and methylcyclopentadiene and high unsaturation terpolymers of isobutylene cyclopentadiene and methylcyclopentadiene and terpolymers of isobutylene, isoprene and methylcyclopentadiene having a number average molecular weight of at least about 120,000 and a mole percent of unsaturation of at least 5% and the process for preparing said polymers which comprises carrying out the polymerization in a homogeneous phase, introducing to the system either an aluminum halide in a soluble form or a hydrocarbylaluminum dihalide and carrying the reaction out at a temperature of less than about $-100°$ C.

31 Claims, 8 Drawing Figures

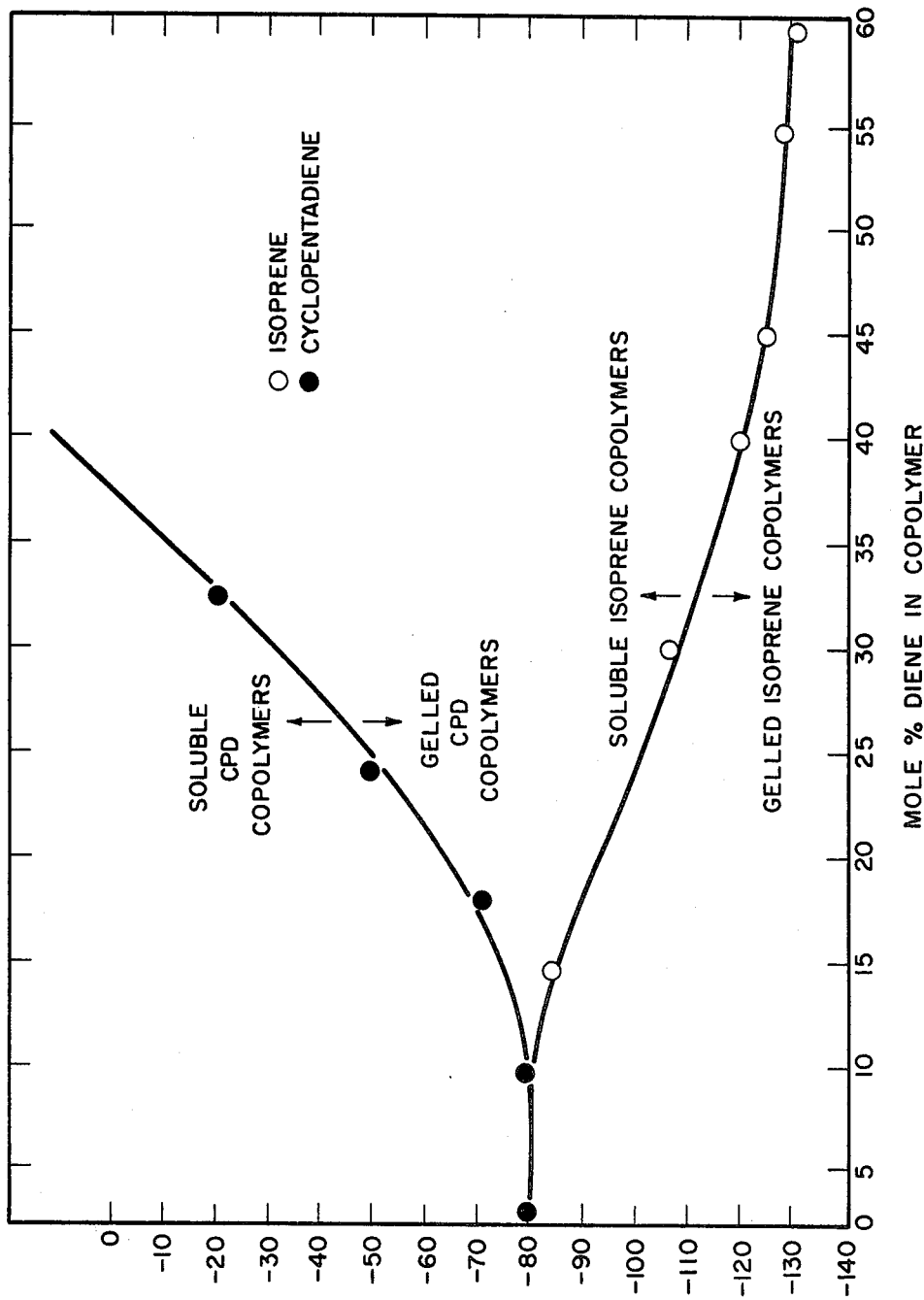
FIGURE I
CRITICAL HOMOGENEOUS POLYMERIZATION TEMPERATURE VERSUS DIENE CONTENT AT MAXIMUM MONOMER CONCENTRATION

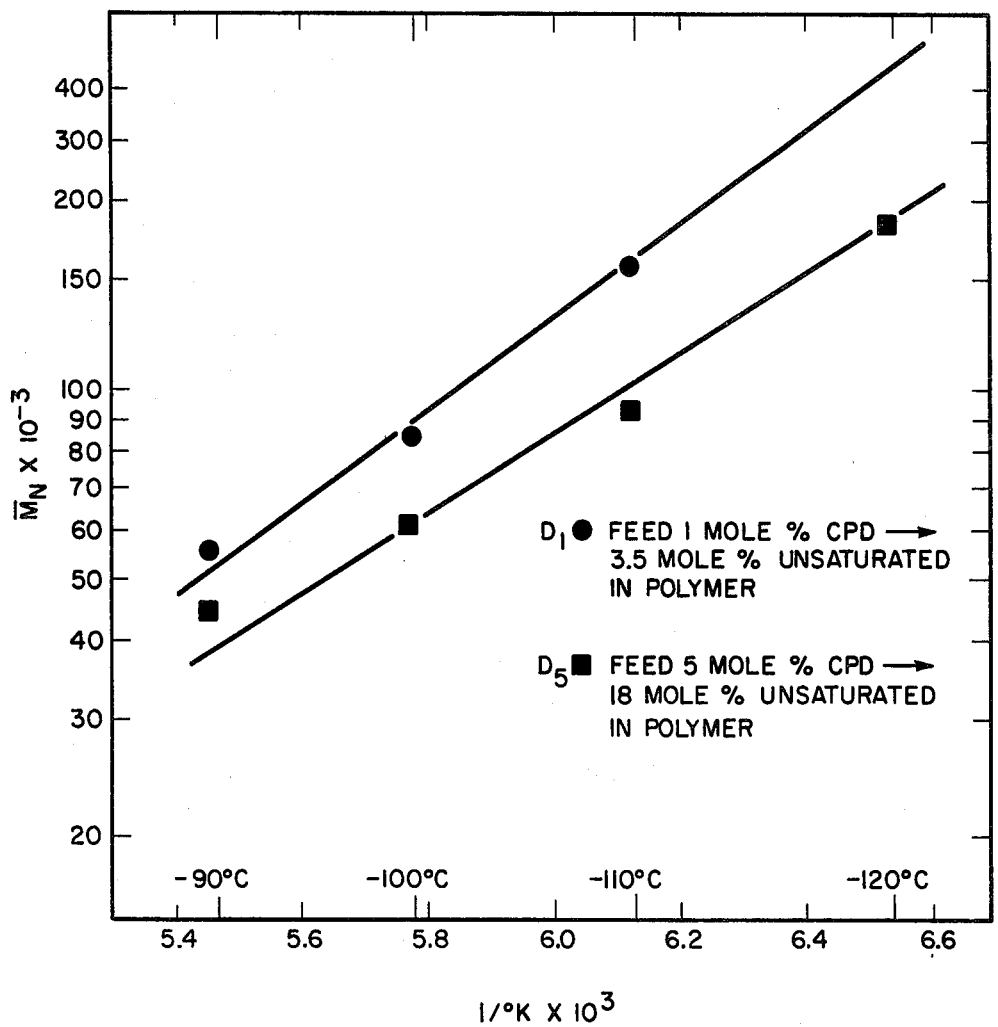

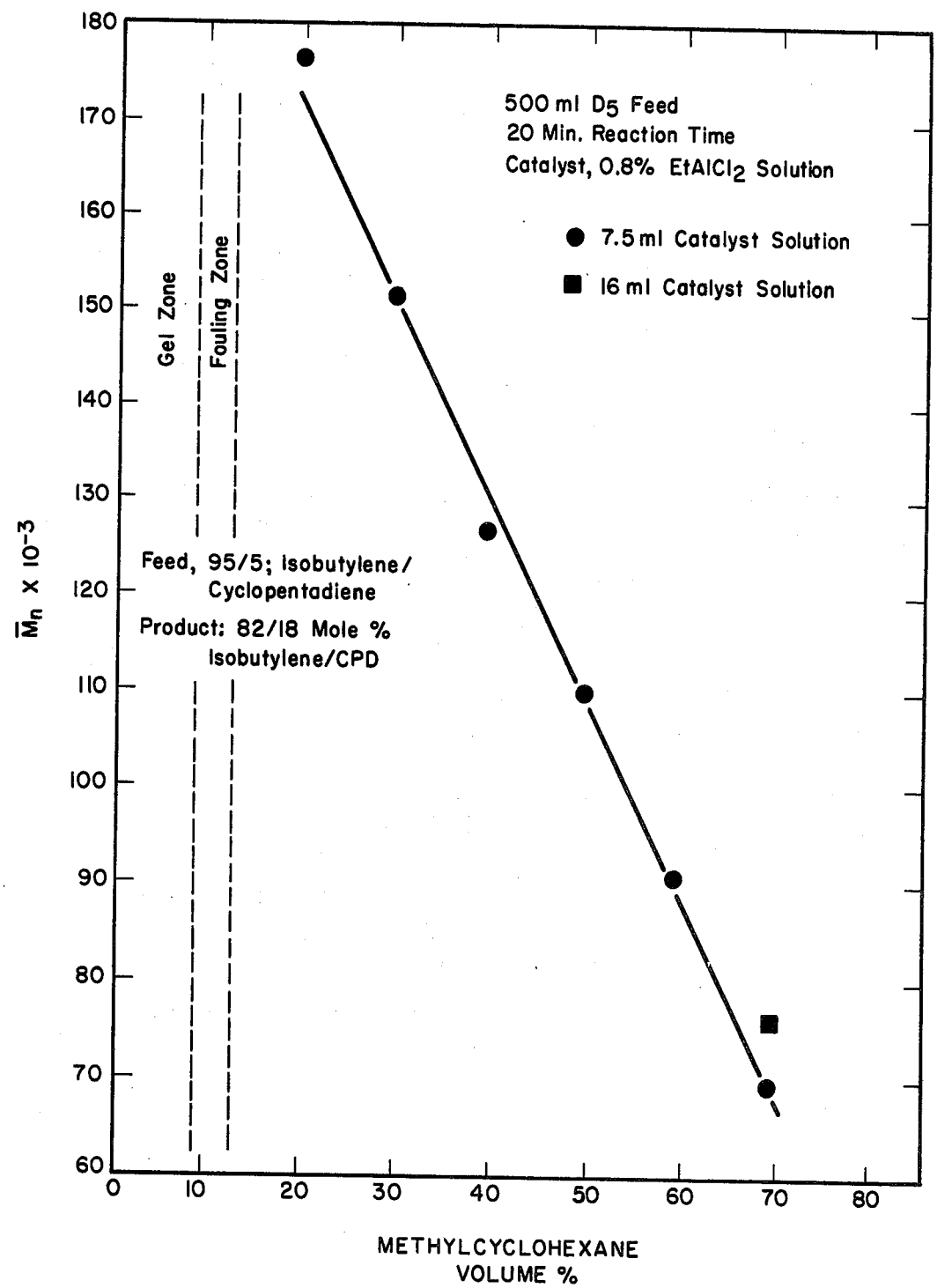

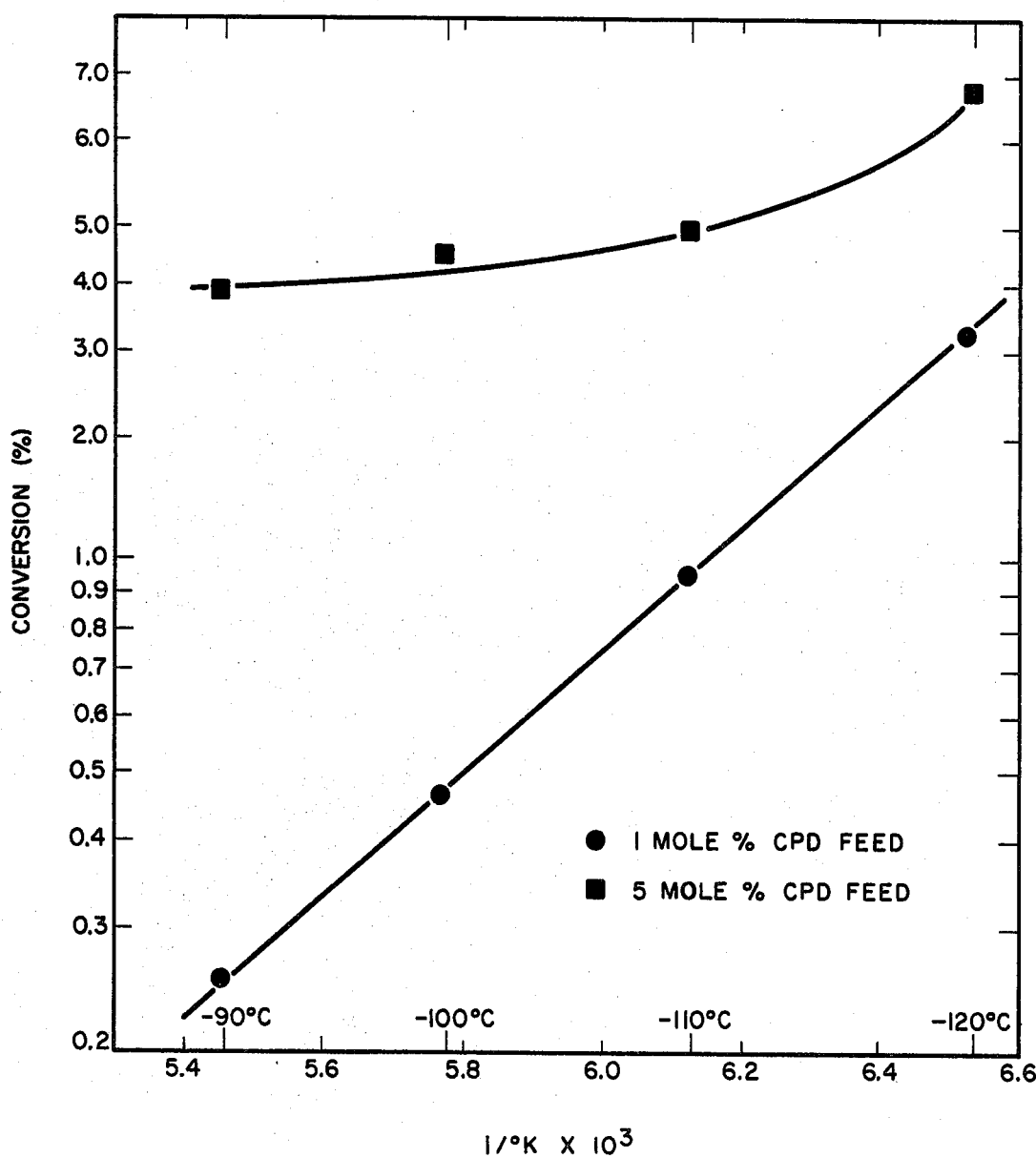
FIGURE IV
CONVERSION VS. TEMPERATURE
$D_1$ & $D_5$ CONSTANT CATALYST AND TIME

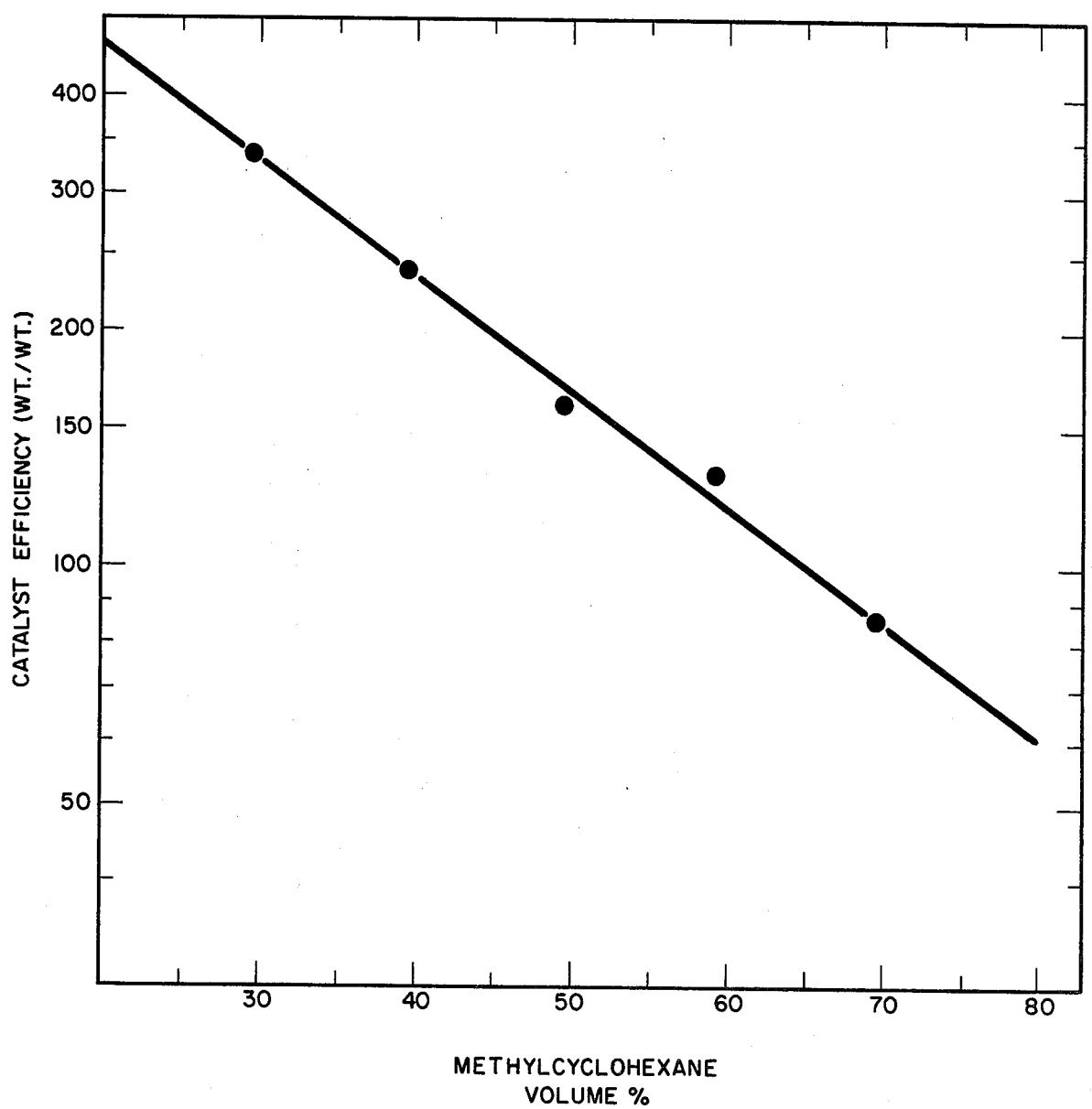

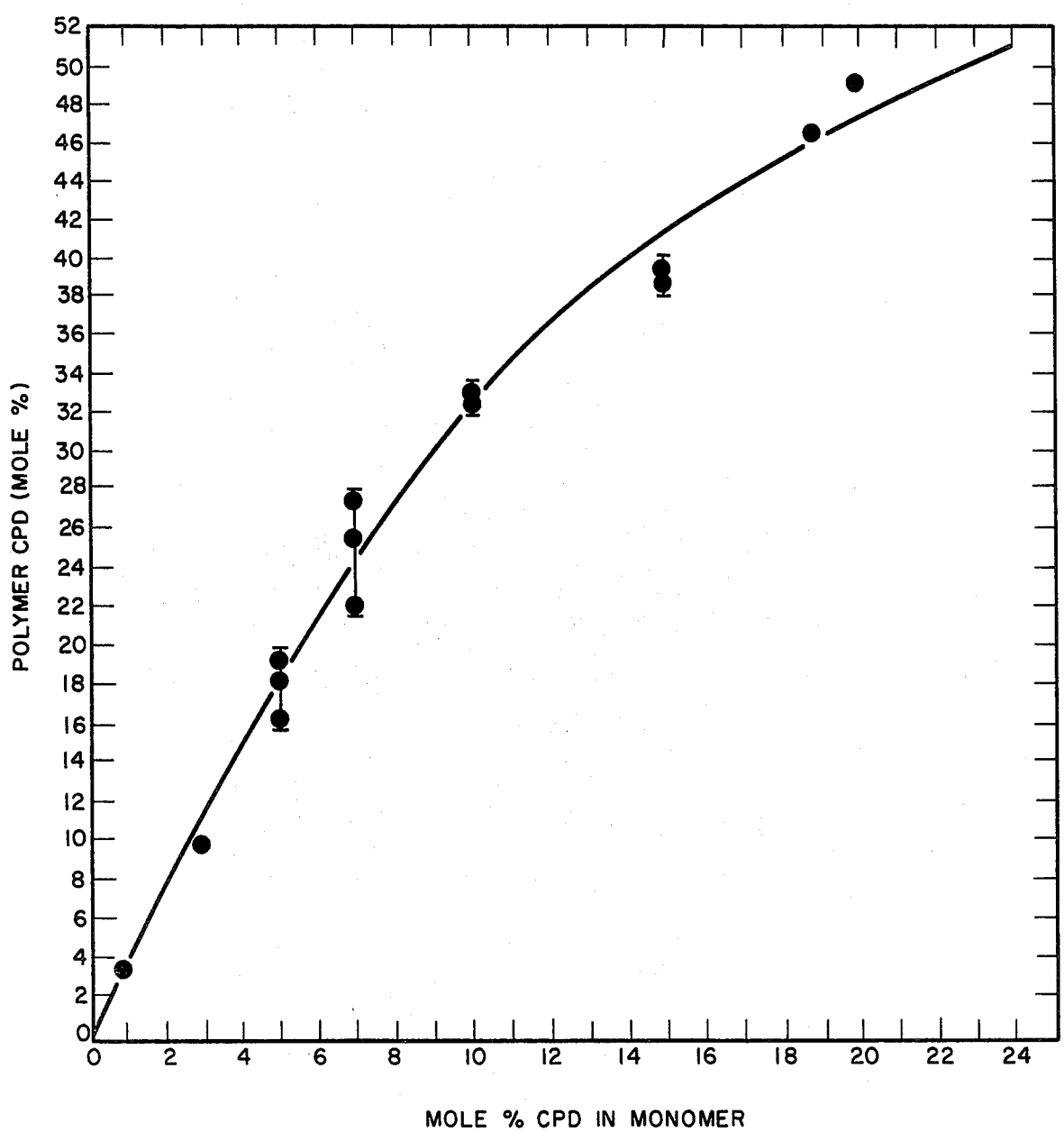
FIGURE VI

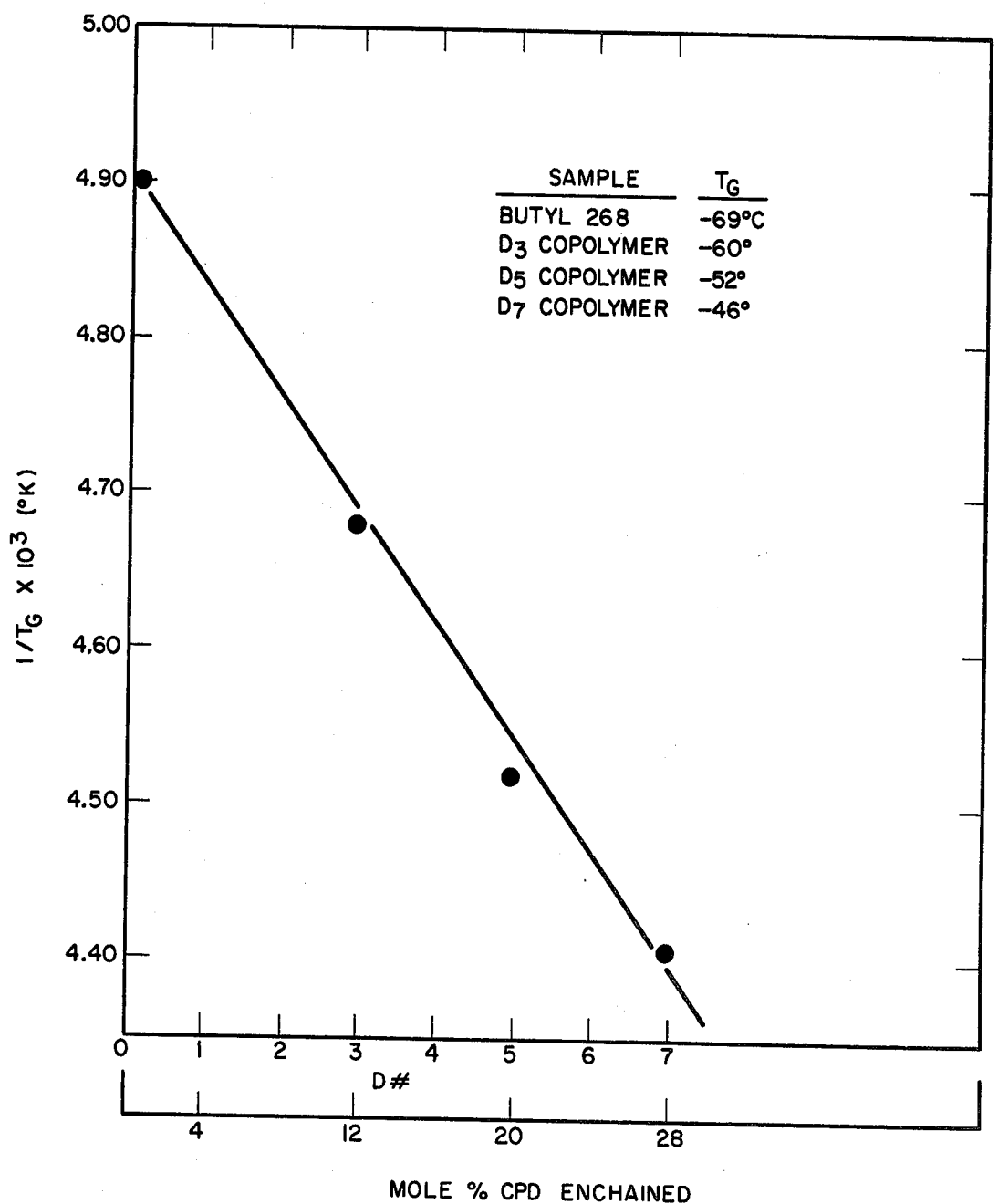

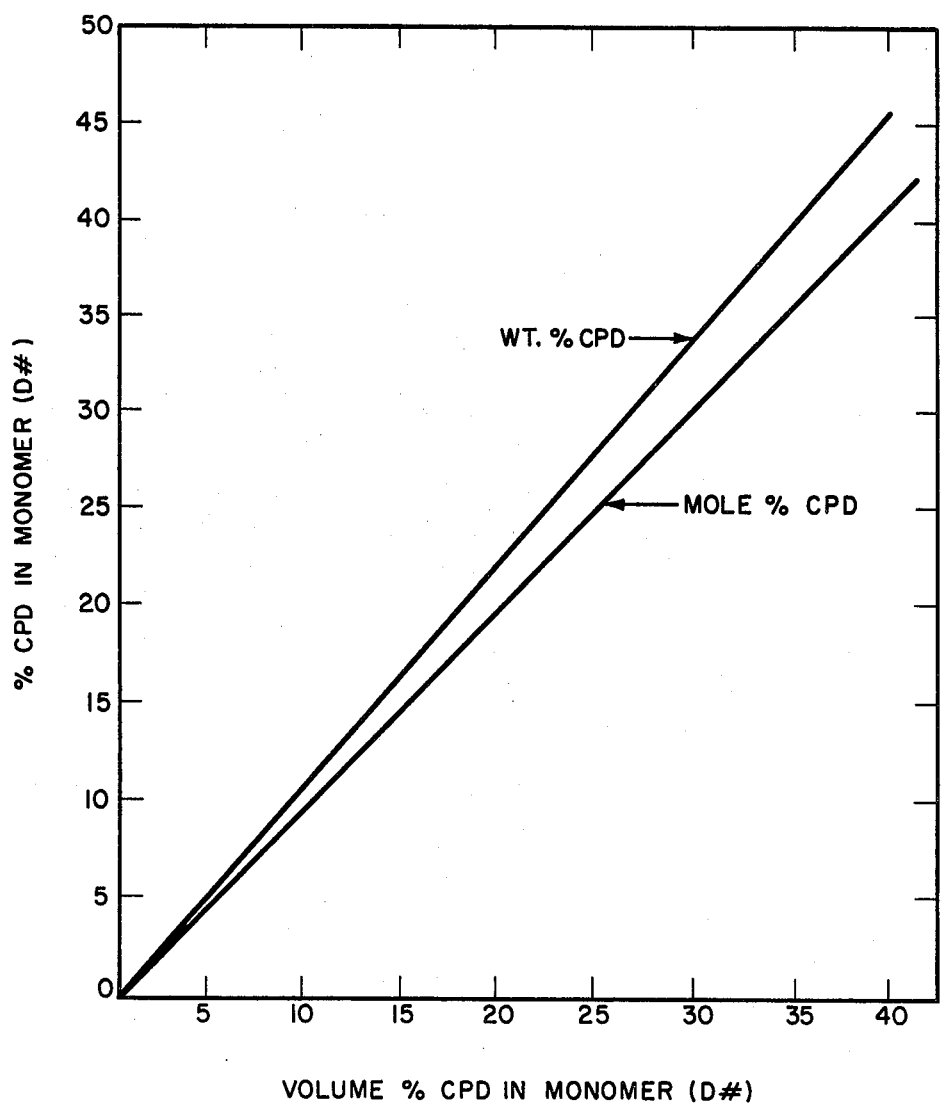
FIGURE VIII
CORRELATION OF D# WITH MOLE % CYCLOPENTADIENE FOR ISOBUTYLENE-CYCLOPENTADIENE MONOMER FEED

HIGH MOLECULAR WEIGHT HIGH UNSATURATION $C_4$-$C_{10}$ ISOOLEFIN CONJUGATED DIOLEFIN COPOLYMERS AND MULTIPOLYMERS CONTAINING METHYLCYCLOPENTADIENE

REFERENCE TO RELATED APPLICATIONS

This application is a divisional application of Ser. No. 787,366 filed Apr. 14, 1977 which in turn is a continuation-in-part application of Ser. No. 631,444, filed Nov. 13, 1975, now U.S. Pat. No. 4,031,300, which is a continuation-in-part application of Ser. No. 457,109, filed Apr. 1, 1974, now U.S. Pat. No. 3,928,297, which is a continuation-in-part of Ser. No. 151,038, filed June 8, 1971, now U.S. Pat. No. 3,808,177.

FIELD OF THE INVENTION

Substantially gel-free, high unsaturation copolymers of isobutylene and methylcyclopentadiene and high unsaturation terpolymers of isobutylene, cyclopentadiene and methylcyclopentadiene and of isobutylene, isoprene and methylcyclopentadiene having a number average molecular weight of at least about 120,000 and a mole percent of unsaturation of at least 5% and the process for preparing said polymers which comprises carrying out the polymerization in a homogeneous phase, introducing to the system either an aluminum halide in a soluble form or a hydrocarbylaluminum dihalide and carrying the reaction out at a temperature of less than about $-100°$ C.

BACKGROUND OF THE INVENTION

Polymers and copolymers of isobutylene are well known in the art. In particular, copolymers of isobutylene with conjugated multiolefins have found wide acceptance in the rubber field. These polymers are generally termed in the art "butyl rubber". The preparation of butyl rubber is described in U.S. Pat. No. 2,356,128, which is incorporated herein by reference.

The term "butyl rubber" as employed in the specification is intended to include copolymers made from the polymerization of a reaction mixture comprising an isoolefin having about 4 to 7 carbon atoms, e.g. isobutylene and a conjugated multiolefin having about 4 to 14 carbon atoms, e.g. isoprene. Although these copolymers are said to contain about 0.2 to about 15% combined multiolefin, in practice the butyl rubber polymers of commerce contain about 0.6 to about 4.5 wt. % of multiolefin; more generally, about 1.0 to about 1.8 wt. %, the remainder of the polymer being comprised of the isoolefin component.

Efforts to prepare isoolefin-multiolefin polymers of high unsaturation have met with varying degrees of success. Where substantially gel-free polymers have been prepared containing more than about 5% multiolefin, the polymers have been of low number average molecular weight. This has been true even where these polymers had high viscosity average molecular weights. In general, however, the products formed by prior art processes are either high in gel content or low in number average molecular weight and of little utility.

Multiolefins are known to be molecular weight and catalyst poisons; furthermore, increased unsaturation in the polymer backbone provides potential sites for gelation. Hence, attempts to prepare more highly unsaturated isoolefin-multiolefin copolymers by prior art methods have resulted in the formation of either low molecular weight or resinous crosslinked polymers which have little or no commercial utility as elastomers.

Although some commercial elastomers such as styrene butadiene rubber or EPDM may contain as much as 2 to 9% gel, isobutylene copolymers of commerce are substantially gel free. The isobutylene copolymers may contain as much as 2% gel but preferably contain less than 1%.

There are numerous patents and literature disclosures which generally disclose polymers and copolymers of isobutylene, the copolymers purportedly having from about 0.5 to 98% unsaturation. Where the prior art copolymers are high in unsaturation, however, they are either low in number average molecular weight or resinous.

Japanese Pat. No. JA27416/68 published 11/26/68 teaches a process for preparing copolymers of conjugated diene compounds with isobutylene which contain "a large amount of conjugated diene compounds" using catalysts prepared by reacting (1) mercuric halide, aluminum halide or hydrogen halide, (2) zirconium halide and (3) aluminum metal in the presence of an aromatic compound, e.g. benzene. These products are described as copolymers which are "rubbery substances when the isobutylene is high and are resinous when the isobutylene content is low". The resinous properties result from gelation and crosslinking of the polymer during its preparation. These gelled and crosslinked products have little utility as rubbers. The products of lower unsaturation, i.e. high isobutylene content rubbers, are of the conventional butyl rubber type.

Japanese Patent JA27417/68 published 11/26/68 teaches a method for preparing copolymers of dienes and isoolefins containing about 0.1 to about 40 wt. %, preferably about 0.5 to 5 wt. % of diene. The polymers are prepared using a catalyst derived from (1) metal oxides of the general formula $M_xO_y$, wherein M is nickel or cobalt and $1 < y/x \leq 1.5$, and (2) aluminum halide. Again, the low unsaturation polymers are the conventional butyl rubbers whereas the highly unsaturated materials are either low in number average molecular weight or are gelled polymers.

U.S. Pat. No. 3,466,268 and its parent counterpart, U.S. Pat. No. 3,357,960 disclose a butadiene isobutylene copolymer and a process for preparing said copolymer. The invention disclosed is a method of improving butadiene polymers by incorporating in the structure varying amounts of isobutylene. Preferably, the amount of isobutylene incorporated is said to be about 2 to 40 wt. %. The polymers disclosed are generally low in number average molecular weight. Substitution of isoprene for butadiene results in highly crosslinked copolymers which have little utility.

U.S. Pat. No. 2,772,255 (Br. 744,514) discloses a method for preparing high molecular weight butyl rubbers. In general, the polymers which are prepared are conventional butyl rubbers having less than 3 mole % unsaturation. Attempts to produce butyl rubber type polymers having unsaturation in excess of 5 mole % unsaturation result in products which either are low in number average molecular weight or are gelled and highly crosslinked.

High unsaturation isobutylene-isoprene copolymers have been prepared (see, for example, U.S. Pat. No. 3,242,147 incorporated herein by reference). Although these polymers are purportedly high in viscosity average molecular weight, the number average molecular weights are low. Hence, the products have little commercial significance.

U.S. Pat. No. 2,521,359 to Garber discloses copolymers consisting primarily of cyclopentadiene with minor amounts of other monomers (including isobutylene) as resins capable of air curing to tough coatings and films. The copolymers of Garber having more than 50% cyclopentadiene are of extremely low molecular weight.

Unlike plastics, elastomers require a high number average molecular weight in order to realize desirable levels in physical properties. For example, tensile strength for elastomers is critically dependent on number average molecular weight since these polymers are used well above their glass transition temperature and are generally amorphous.

In contrast to elastomers, plastics are used well below their glass transition temperature and it is molecular associations which gives them their structural integrity. As a result, number average molecular weights in the order of 10,000 to 70,000 are adequate for commercial utility.

Elastomers, on the other hand, obtain their structural integrity from a crosslinked network. Perfection of this network is directly dependent on the length of the polymer molecules from which the network is derived. Number average molecular weight ($\overline{M}n$) is a measure of the length of the molecules. Viscosity or weight average molecular weights are misleading measurements since their numerical value is greatly affected by small variations in the distribution of the higher molecular weight fractions. Hence, polymers of low number average molecular weight may have high viscosity average molecular weight as a result of disproportionate distribution of the high molecular weight fraction.

The importance of number average molecular weight on tensile strength has long been recognized (see, for example, Flory, p. 5, Ind. Eng. Chem., 38, 417 (1946), incorporated herein by reference. Flory showed that, for low unsaturation elastomeric copolymers of isobutylene, tensile strength increased rapidly as the number average molecular weight was increased beyond a minimum value (i.e. 100,000) then approaches an asymptotic limit.

For economic reasons, oil extendability is an essential characteristic of a commercial elastomer for almost all major uses. The tensile strength of butyl rubber vulcanizates is reduced by the addition of oil, and to retain the original tensile strength of the undiluted composition it is necessary to increase the number average molecular weight. Oil extension also improves the low temperature properties of butyl inner tubes and when this phenomenon was discovered, it was necessary to develop higher molecular weight polymers to accommodate the added oil. See, for example, Buckley et al, *Ind. Eng. Chem.*, 42, 2407 (1950).

This finding resulted in the rapid adoption by industry of the high molecular weight type of butyl GR-1-18 with Mooney viscosity greater than 71 (212° F.). These materials generally have number average molecular weights of 150,000 or greater. In contrast, the previously used polymers which have number average molecular weights of less than 120,000 with Mooney viscosity specification of 38-49 (212° F.) were limited to applications which did not require oil extension, and today represent a very minor portion of the butyl rubber market having been supplanted almost entirely by the higher molecular weight butyl rubbers.

Although it has been postulated that higher unsaturation copolymers of isobutylene would be attractive polymers, useful polymers have not been available since the prior art methods are not capable of producing highly unsaturated, e.g., at least 5 mole % to about 45 mole %, isobutylene copolymers of sufficiently high number average molecular weight. Hence, the prior art isobutylene-conjugated diene copolymers offered commercially are low in unsaturation, e.g., 1–4.5 mole %.

Hence, heretofore, methods of preparing copolymers of isoolefins and conjugated dienes have not included a means for making commercial quality elastomers containing greater than 5 mole % diene.

Although the isobutylene-conjugated dienes of commerce have improved ozone resistance, these polymers are still subject to ozone cleavage since the site of unsaturation is in the polymer backbone. It has been postulated that isobutylene copolymers having unsaturation on the side chain rather than the backbone would be highly resistant to ozone attack. Attempts to produce such polymers using cyclopentadiene as the diene comonomer have been notably unsuccessful.

Isobutylene-cyclodiolefin copolymers and terpolymers of the prior art have been too low in molecular weight to be of commercial significance. Some improvement in molecular weight has been accomplished by copolymerizing isobutylene with minor amounts of cyclopentadiene (CPD) or methylcyclopentadiene (MCPD) along with others monomers including cross-linking agents such as divinyl benzene. The resulting products are somewhat improved terpolymers or tetrapolymers resulting from the linking of the low molecular weight isobutylene-CPD chains into two dimensional highly branched polymers. Such polymers, however, have inferior physical properties as compared to the butyl rubbers of commerce and hence have not gained acceptance.

A review of the art illustrates the problems encountered where attempts were made to prepare copolymers of isobutylene and cyclopentadiene (CPD) or methylcyclopentadiene (MCPD). For example, U.S. Pat. No. 2,577,822, and U.S. Pat. No. 3,511,821, incorporated herein by reference, teach the need for the addition of divinyl benzene in order to compensate for the deleterious effect of CPD or MCPD on molecular weight.

U.S. Pat. No. 3,080,337, incorporated herein by reference, teaches the addition of isoprene as a third monomer but the resulting products are low in unsaturation and have poor physical properties. Others have made various attempts to produce CPD isoolefin copolymers with varying degrees of success; see, for example, U.S. Pat. Nos. 3,239,495; 3,242,147; 2,521,359; British patent 1,036,618 and I & EC Prod R and D 1, 216–20 (1962) incorporated herein by reference. These polymers, however, have substantially no commercial significance because, even when only minor amounts of CPD were present, they are low in number average molecular weight.

SUMMARY OF THE INVENTION

It has surprisingly been found that valuable substantially gel-free copolymers of isoolefins and methylcyclopentadiene having a mole % unsaturation of at least about 5% can now be prepared having molecular weight ($\overline{M}n$) of at least about 120,000, terpolymers of isoolefins, cyclopentadiene and methylcyclopentadiene and terpolymers of isoolefins, isoprene and methylcyclopentadiene having a mole % unsaturation of at least about 5% can now be prepared having molecular weight ($\bar{M}n$) of at least about 120,000 by carrying out the polymerization in the presence of not more than about 40% by volume based on the total of monomers plus cosolvent, of a cosolvent which is a solvent for the polymer at the polymerization temperature and carrying out the reaction at a temperature of less than about $-100°$ C. The catalyst may be an aluminum halide introduced into the reaction zone dissolved in a polar solvent or the catalyst may be a hydrocarbylaluminum dihalide as disclosed in U.S. Pat. No. 3,856,763 incorporated herein by reference.

The quantity of cosolvent used is kept to a minimum in order to maximize molecular weight. The optimum cosolvent level is determined by selecting the minimum solvent-monomer ratio at which the copolymer to be prepared remains in solution at the polymerization temperature.

Surprisingly, the process of this invention makes it possible to prepare isobutylene-methylcyclopentadiene copolymers and isobutylene-cyclopentadiene-methylcyclopentadiene terpolymers and isobutylene-isoprene-methylcyclopentadiene terpolymers of the desired number average molecular weight. Terpolymers of isobutylene, methylcyclopentadiene and a third conjugated multiolefin have unusual ozone resistance.

Copolymers and terpolymers and multipolymers containing methylcyclopentadiene exhibit increased vulcanization reactivity thereby permitting lower percentage of unsaturation in the copolymer and terpolymers as compared to copolymers and terpolymers containing cyclopentadiene in order to obtain similar physical properties. Additionally, copolymers and terpolymers containing methylcyclopentadiene are more compatible with high functionality rubbers than are copolymers and terpolymers containing cyclopentadiene.

BRIEF DESCRIPTION OF THE DRAWINGS

FIG. I shows the relationship between critical homogeneous polymerization temperature and diene content.

FIG. II shows the effect of polymerization temperature on number average molecular weight.

FIG. III shows the effect of cosolvent concentration on molecular weight.

FIG. IV shows the effect of polymerization temperature on conversion.

FIG. V shows catalyst efficiency as a function of cosolvent concentration.

FIG. VI shows the relationship between mole % cyclopentadiene in the feed as compared to mole % cyclopentadiene in the polymer.

FIG. VII shows the relationship between glass transition temperature and mole % cyclopentadiene enchainment in the copolymer.

FIG. VIII is a correlation of D # with mole % cyclopentadiene in the monomer feed.

DETAILED DESCRIPTION

This invention relates to a method for preparing substantially gel-free copolymers of isobutylene and methylcyclopentadiene and terpolymers of isobutylene-cyclopentadiene and methylcyclopentadiene and terpolymers of isobutylene-isoprene-methylcyclopentadiene having a number average molecular weight, as measured by membrane osmometry, of at least about 120,000 and a mole % unsaturation of at least about 5%.

In order to obtain the copolymers and terpolymers of this invention, the reaction should be carried out at less than about $-100°$ C. To obtain the desired number average molecular weight in a substantially gel-free polymer, a homogeneous polymerization is required. This is achieved by carrying out the reaction in a vehicle which is a solvent for the copolymer at the reaction temperature. The vehicle comprises predominantly the monomers to be polymerized in conjunction with an inert cosolvent or mixtures of inert cosolvents plus catalyst solvent.

The copolymers of the instant invention are formed from an isoolefin and methylcyclopentadiene.

The terpolymers of the instant invention are formed from an isoolefin and two conjugated hydrocarbon multiolefins, wherein one of the conjugated multiolefins is methylcyclopentadiene and the other multiolefin can be either a straight chain multiolefin or a cyclic multiolefin.

The isoolefins suitable for use in the practice of the inventions are preferably hydrocarbon monomers having about 4 to about 10 carbon atoms. Illustrative nonlimiting examples of these isoolefins are isobutylene, 2-methyl-1-butene, 3-methyl-1-butene, 4-methyl-1-pentene, beta-pinene, etc. Preferably, the isoolefin is isobutylene.

The multiolefins suitable for use in this invention are conjugated hydrocarbon multiolefins having 5 to about 14 carbon atoms; more preferably, the multiolefins are conjugated diolefins of 5 to 9 carbon atoms. Illustrative nonlimiting examples of these multiolefins are isoprene, piperylene, 2,3-dimethyl butadiene, 2,5-dimethylhexadiene-2,4-ene, cyclopentadiene, methylcyclopentadiene, cyclohexadiene, fulvene, etc. and mixtures thereof.

It is essential in carrying out the process of this invention that the cosolvent comprise at least 5% by volume and not more than 40% by volume of the total reaction mixture. Preferably, about 5 to about 30 volume % solvent is used; more preferably about 7.5 to 25 volume percent, most preferably about 10 to about 20 volume percent, e.g., 15 volume %. The term "total reaction mixture" as used in the specification and claims means total monomers plus cosolvent.

The optimum amount of cosolvent to be used is the minimum amount necessary to avoid reactor fouling or gelation. If too little cosolvent is used reactor fouling or gelation of the product results. Too high a level results in undesirable lowering of number average molecular weight.

For the purposes of this invention, it is convenient to define the volume % of inert cosolvent as that calculated based on the volume of monomers at the polymerization temperature while the volume of cosolvent is determined at 25° C. The volume % of cosolvent as calculated is uncorrected for volume changes and cooling of the solvent to reaction conditions. The volume of monomers such as cyclopentadiene which freeze at the polymerization temperature were measured at $-78°$ C. (dry ice temperature).

The minimum quantity of a given cosolvent required to produce gel-free polymers is a function of the cosolvent, the conjugated multiolefin used and the polymerization temperature. Having selected the composition of the blend of monomers and the cosolvent to be used the minimum quantity of cosolvent required is readily determined by carrying out the polymerization using varying amounts of cosolvent. The minimum quantity of cosolvent necessary is that amount required to maintain a homogeneous system; that is to prevent precipitation of polymer during polymerization.

The term "cosolvent" as used in the specification and claims means the inert solvent which, together with the monomer feed, comprises the vehicle for the reaction. The cosolvent and monomers must be mutually soluble and the blend of monomers plus cosolvent must be a solvent for the copolymer at the polymerization temperature. The term "inert" means that the cosolvent will not react with the catalyst or otherwise enter into the polymerization reaction. The cosolvent must not contain substituents in its molecule which will interfere with the polymerization reaction. Aliphatic hydrocarbons are suitable cosolvents. The preferred cosolvents are paraffinic hydrocarbons, and carbon disulfide. Preferably, the paraffinic hydrocarbon solvent is a $C_5$-$C_{10}$ hydrocarbon, more preferably a $C_5$ to $C_8$ hydrocarbon. Illustrative examples of the hydrocarbon solvents are pentane, isopentane, methylpentane, hexane, cyclohexane, methylcyclohexane, dimethylcyclohexane, heptane, isooctane, 1,2,3,3-tetramethyl hexane, tetramethyl cyclohexane, etc. Generally any paraffin, whether normal, branched or cyclic which is a liquid under polymerization conditions, may be used. The term "paraffin" as used in the specification and claims includes normal paraffins, cycloparaffins and branched paraffins or mixtures thereof. When the diene is cyclodiene preferred cosolvents contain cycloparaffins.

Since the monomers act as part of the solvent system for the polymer, the conversion level of the polymerization must not be so great as to result in precipitation of the copolymer as a result of depletion of solvent. Preferably the conversion level is about 2 to about 30%; more preferably about 3 to 15%; most preferably about 5 to about 13%, e.g., 10%.

In the practice of this invention the catalyst can be an aluminum halide or a hydrocarbylaluminum dihalide. Where an aluminum halide is used, it must be in the form of a homogeneous solution or submicron dispersion of catalyst particles, e.g., colloidal dispersion. Therefore, the aluminum halide catalyst must be dispersed or dissolved in a suitable catalyst solvent or mixture of solvents. The aluminum halide catalyst solvent must be a polar solvent. Illustrative examples of suitable aluminum halides are $AlCl_3$ and $AlBr_3$. The preferred aluminum halide catalyst is aluminum chloride. The term "polar solvent" as used in the specification and claims means non-aromatic, organic solvents having a dielectric constant at 25° C. of at least 4, preferably about 4 to about 20, more preferably about 6 to about 17; most preferably about 9 to about 13. These polar solvents, however, must not contain sulfur, oxygen, phosphorus or nitrogen in the molecule since compounds containing these elements will react with or otherwise deactivate the catalyst.

The preferred polar solvents are inert halogenated aliphatic hydrocarbons; more preferably halogenated paraffinic hydrocarbons and vinyl or vinylidene halides; most preferably primary or secondary chlorinated paraffinic hydrocarbons. The halogenated hydrocarbon is preferably a $C_1$-$C_5$ paraffin hydrocarbon; more preferably a $C_1$-$C_2$ paraffin. The ratio of carbon atoms to halogen atoms in the polar solvent is preferably 5 or less. Preferably, the halogen is chlorine.

Illustrative examples of these polar organic solvents are methylchloride, ethyl chloride, propyl chloride, methyl bromide, ethyl bromide, chloroform, methylene chloride, vinyl chloride, vinylidene chloride, dichloroethylene, etc. Preferably, the polar solvent is methyl chloride or ethyl chloride. Generally any inert halogenated organic compound which is normally liquid under polymerization conditions and has a dielectric constant of at least 4.0 may be used.

It is essential in carrying out this invention that the aluminum halide catalyst be in solution in the polar organic solvent prior to introduction of the catalyst to reaction medium. Combining the polar organic solvent with the reaction medium and thereafter adding the aluminum halide catalyst thereto will not result in the production of the high $\bar{M}n$, high unsaturation polymers of this invention.

Use of the term "solution" with reference to the polar organic solvent/aluminum halide systems is intended to include both true solutions and colloidal dispersions since they may exist concurrently in the same system.

The aluminum halide/polar solvent catalyst preferably comprises about 0.01 to about 2 weight % aluminum halide; more preferably about 0.05 to about 1; most preferably 0.1 to about 0.8.

As previously noted, the catalyst may also be a hydrocarbylaluminum dihalide. The hydrocarbyl group can be a $C_1$-$C_{18}$ straight chain, branched or cyclic group. Both cycloaliphatic and aromatic substituents can comprise the hydrocarbyl radical. Alkyl groups, especially lower alkyl groups, e.g., $C_1$-$C_4$, are preferred because of their general availability and economy of use. The halide can be bromide or chlorine, preferably chlorine. The term "dihalide" as used in the specification and claims means dichloride or dibromide.

Illustrative examples of these hydrocarbyl aluminum dihalides are methylaluminum dichloride, ethylaluminum dichloride, isobutylaluminum dichloride, methylaluminum dibromide, ethylaluminum dibromide, benzylaluminum dichloride, phenylaluminum dichloride, xylylaluminum dichloride, toluylaluminum dichloride, butylaluminum dichloride, hexylaluminum dichloride, octylaluminum dichloride, cyclohexylaluminum dichloride, etc. The preferred catalysts are methylaluminum dichloride, ethylaluminum dichloride and isobutylaluminum dichloride.

The hydrocarbyl aluminum dihalide catalyst may be added neat or in solution. Preferably where a catalyst solvent is used, it is a liquid paraffin solvent or cycloparaffin solvent. It is advantageous though not necessary to use paraffins of low freezing point. Methylcyclohexane is particularly useful since catalyst solutions of about 1% concentration do not freeze at −120° C.

The concentration of the catalyst is not critical. Very dilute catalyst solutions, however, are not desirable since substantial fractions of the catalyst may be deactivated by impurities. Very concentrated solutions are undesirable since at polymerization temperatures catalyst may be lost by freezing out of solution.

In carrying out the polymerization of this invention those skilled in the art will be aware that only catalytic amounts of catalyst solution are required. Preferably the volume ratio of monomer plus cosolvent to catalyst solution is about 100/1 to about 9/1; more preferably about 80/1 to about 10/1; most preferably about 50/1 to abuot 20/1.

In practicing the process of this invention, it is essential that the polymerization be carried out in the homogeneous phase without the precipitation of polymer. Conventional slurry processes are inapplicable for the preparation of the high unsaturation polymers of this invention since by their nature they result in polymer precipitation with gelation of the polymer as a consequence.

The amount of cosolvent required in order to maintain the polymerization reactants and product in solution throughout the polymerization is a function of the multiolefin selected for polymerization and its concentration in the monomer feed. The polymerization temperature at which precipitation of polymer will occur is itself a function of the amount of and type of cosolvent and the particular multiolefin being copolymerized.

The term "critical homogeneous polymerization temperature" as used in the specification and claims means that polymerization temperature below which precipitation of polymer will occur when no cosolvent is included in the reaction mixture, i.e., the only solvent for the reactants and product being the monomer feed.

Characterization of polymers prepared by bulk polymerization, i.e., without cosolvent, shows that the polymers formed are low in number average molecular weight ($\bar{M}n$). In order to increase $\bar{M}n$, the lowering of polymerization temperature is an obvious expedient. However, in the absence of cosolvent, the result is not greater $\bar{M}n$ but gelation.

The problem of gelation is obviated by the addition of a cosolvent which permits the lowering of polymerization temperature below the critical homogeneous polymerization temperature. It has been found that a polymerization temperature below about $-100°$ C. is necessary in order to achieve $\bar{M}n$ values of at least about 120,000 for the copolymer and terpolymers of the present invention. At least 5 volume % inert solvent based on the monomer feed is necessary in order to carry out the polymerization in solution at these low temperatures.

Referring now to FIG. 1, the volume % of multiolefin (isoprene) in the monomer blend (B No.) is plotted as a function of the polymerization temperature below which precipitation of polymer and as a consequence gelation occurs in the absence of cosolvent. The curve represents the critical homogeneous polymerization temperatures for isobutylene-isoprene systems.

The process of this invention incorporates the isobutylene and isoprene into the copolymer in substantially the same ratio as it exists in the feed. For example, where an isobutylene-isoprene monomer feed comprises 15 volume % isoprene the polymer formed therefrom comprises about 12.5 mole % unsaturation. Characterization of polymers prepared by bulk polymerization, i.e., without cosolvent, shows that the polymers formed are low in number average molecular weight ($\bar{M}n$). In order to increase $\bar{M}n$, the lowering of polymerization temperature is an obvious expedient. However, in the absence of cosolvent, the result is not greater $\bar{M}n$ but gelation.

The terms "unsaturation" or "multiolefin content" as used with reference to the amount of multiolefin enchainment in the product are equivalent terms. The composition of the copolymer (mole % unsaturation = mole % diene content) is substantially the same as the composition of the feed for acyclic dienes, such as isoprene and piperlyene. However, where the diene is a cyclic diene such as methylcylopentadiene, it is present in considerably higher amounts, in the copolymer as in the feed.

The necessity for utilizing low polymerization temperatures is exemplified by FIG. 2 which shows the exponential decrease in number average molecular weight with increasing temperature. The criticality of selecting the proper quantity of cosolvent is demonstrated in FIG. 3. Too little cosolvent results in precipitation of the polymer with reactor fouling or gelation. Too much cosolvent results in a low molecular weight product. Further benefits of low temperature and proper selective of appropriately low cosolvent concentration are demonstrated in FIGS. 4 and 5. FIG. 4 shows that reactivity is favored by low temperatures (in addition to the molecular weight benefit). FIG. 5 shows that catalyst efficiency is favored by low cosolvent concentration (in addition to the molecular weight benefit).

In practicing the process of this invention, one skilled in the art may proceed as follows in order to determine the preferred reaction conditions.

First, a convenient polymerization temperature below about $-100°$ C. is selected. Next the desired feed composition, i.e. monomers and ratio of isoolefin to conjugated dienes and the cosolvent to be used are selected. Polymerization reactions are carried out using successively greater amounts of solvent. The initial polymerization reaction is carried out using 5 volume % based on the total of monomer plus solvent of the cosolvent since lesser amounts will be inadequate. In each successive run an additional 5 volume % is added. The procedure is continued until the reaction medium remains clear throughout the reaction. Turbidity is indicative of precipitation of polymer which leads to reactor fouling or gelation.

The polymer formed is characterized for $\bar{M}n$ and mole % unsaturation. Where a higher $\bar{M}n$ is desired it may be achieved by either lowering the polymerization temperature or where possible using slightly less solvent than determined by the above method, e.g., 1-2 volume % less, provided that turbidity does not occur. Reduction of polymerization temperature may result in a greater cosolvent requirement. Hence, the aforegoing procedure of adding additional solvent to the reaction medium must be continued until the reaction medium is again clear throughout the polymerization.

Where the mole % unsaturation is to be adjusted somewhat more or less of the diene is used depending on whether a slightly higher or lower unsaturation is desired. Change in feed composition may require readjusting the cosolvent requirement. Generally, increasing the multiolefin content of the monomer feed decreases the cosolvent requirements of the system with acyclic diene-like isoprene and increases the cosolvent requirement with cyclodiene such as cyclopentadiene.

The optimum reaction conditions are those which give the maximum $\bar{M}n$ at the highest (warmest) temperature for the desired unsaturation level. The smaller the quantity of cosolvent used the greater the $\bar{M}n$. Economic considerations dictate the use of the warmest temperature practical for polymerization. Use of lower temperatures will necessitate the use of greater amounts of cosolvent. Preferably, the polymerization temperature is above $-110°$ C.

In an alternate approach to determine the necessary quantity of cosolvent, the reactions are carried out in bulk without using cosolvent. For each different multiolefin content monomer feed, polymerizations are carried out at progressively lower temperatures until the critical homogeneous polymerization temperature for the feed composition is determined. The polymerization is repeated for different feed compositions and the data obtained are the critical homogeneous polymerization temperatures as a function of multiolefin content of the feed. A plot of these data gives the critical homogeneous polymerization temperature curve analogous to that of FIG. 1. The polymer formed is analyzed for multiolefin content and a determination is made of the correlation mole % unsaturation in the polymer and volume % multiolefin in the feed. The polymers formed in bulk copolymerization of isobutylene and isoprene or isobutyleneisoprene cyclopentadiene are unsuitable for commercial use since they have a very low $\bar{M}n$. In order to increase the Mn of the polymer it is necessary to carry out the polymerization at lower temperatures, e.g., less than about $-100°$ C., which requires the addition of cosolvent to prevent precipiation of polymer during polymerization.

The quantity of solvent used should be kept to a minimum since excess cosolvent results in the lowering of Mn. In determining the amount of solvent to be used the monomer feed composition is determined. A convenient polymerization temperature below about $-100°$ C. is selected.

The minimum cosolvent requirements for a particular isoolefin-multiolefin may be determined by carrying out the polymerization at the critical homogeneous polymerization temperature for the isoolefin-multiolefin feed composition, terminating the polymerization by destroying the catalyst and, with constant stirring, lowering the temperature of the system to the desired polymerization temperature. The polymer which, of course, is by definition insoluble below the critical homogeneous polymerization temperature will precipitate out and the system will appear turbid. The polymer will not be gelled, however, since polymerization was terminated prior to precipitation. The cosolvent selected is then added in incremental amounts until the turbidity disappears. The quantity of solvent so added is a good approximation of the minimum solvent requirements for a given isoolefin-multiolefin feed to be polymerized at a given temperature.

The term "solution polymerization" as used in the specification and claims means a polymerization carried out so that the polymer product remains dissolved throughout the reaction.

Where the diene is methylcyclopentadiene the preferred cosolvents are methylcyclohexane (MCH) and cyclohexane or paraffin mixtures containing one of these materials utilized at about 10 to about 30 volume %, e.g., 20 to about 25 volume %.

The products of this invention offer a number of important advantages over the commercially available butyl rubbers. In addition to possessing superior cold flow and green strength properties while retaining the low air permeability and mechanical damping characteristics of conventional low unsaturation isoolefin copolymers, the products of this invention offer greater versatility in vulcanization techniques. Furthermore while the vulcanization of conventional isoolefin-multiolefin copolymers requires the use of ultra-accelerator type cures, e.g., thiuram (Tuads) or dithiocarbamates (Tellurac), the products of this invention may be vulcanized using the thiazole, e.g., mercaptobenzothiazole, type cures currently used in the vulcanization of general purpose rubbers, e.g., natural rubber, SBR, polybutadiene, etc. Because of certain factors in which premature vulcanization (scorch) is a prime example, modern practice has tended towards the use of a special class of thiazoles called delayed action accelerators. These delayed action accelerators permit the processing of the compounded rubber (including vulcanizing agents) at the vulcanization temperature for a predetermined period of time before vulcanization commences. Such cure techniques are not possible with conventional isoolefin copolymers. The delayed action accelerators are, however, used advantageously in the vulcanization of the isoolefin copolymers of this invention.

The delayed action accelerators suitable for use in vulcanizing the products of this invention include the benzathiole sulfenamides having the general formula:

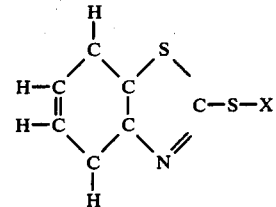

wherein X is an amino group. The amino group is mono or diorganosubstituted and may be cyclic including heterocyclic. For example, X may be

or $-N=R_2$ where $R_1$ is H or R, R is organo or cycloorgano, and $R_2$ is a divalent organo radical. Illustrative examples of X are cyclohexylamino, tertiary butyl amine, diisopropyl amino, dicyclohexyl amino, pentamethylene-amino, morpholino, 2-(2,6-dimethyl morpholino), etc. Specific illustrative examples of these sulfenamides are N,N-diethylbenzothiazole-2-sulfenamide, N,N-diisopropyl benzothiazole-2-sulfenamide, N-tertiary butyl benzothiazole-2-sulfenamide, N-cyclohexyl benzothiazole-2-sulfenamide, N,N-dicyclohexyl benzothiazole-2-sulfenamide, 2-(morpholino) benzothiazole sulfenamide, 2-(2,6-dimethyl morpholino) benzothiazole sulfenamide, 2-piperdinyl benzothiazole sulfenamide. In general, any benzothiazole sulfenamide may be used as a delayed action accelerator for the sulfur vulcanization of the polymers of this invention.

The delayed action accelerator is incorporated into the vulcanizable polymer composition at preferably about 0.1 to about 5 wt. % based on the polymer; more preferably about 0.25 to about 3.5; most preferably about 0.5 to about 3.0 wt. %, e.g., 0.5 to about 2.5 wt. %.

As it is well known, the delayed action cures are sulfur cures and sulfur must be incorporated into the polymer blend either as elemental sulfur or as nonelemental sulfur. Suitable nonelemental sulfur is in the form of those compounds which will release sulfur to the polymer under vulcanization conditions. For a description of these nonelemental sulfur compounds, generally, see *Vulcanization of Elastomers*, Ch. 4, J. C. Ambelang, Reinhold, New York, 1964. Illustrative examples of these nonelemental sulfur compounds are dimorpholvinyl disulfide and alkyl phenol disulfides. The term "sulfur donor" as used hereinafter in the specification and claims means elemental sulfur as well as the aforementioned nonelemental sulfur compounds. The quantity of sulfur donor required for vulcanization is well known. Where the sulfur donor is elemental sulfur, it is incorporated into the polymer at about 0.1 to about 5 wt. % based on the polymer; more preferably about 0.25 to about 3.5 wt. %; most preferably about 0.5 to about 3.0 wt. %, e.g. 0.5 to about 2.5 wt. %. Where the sulfur donor is a nonelemental sulfur compound, it is incorporated at a wt. % of about three times that required for elemental sulfur. The term "nonelemental sulfur compounds" means organic compounds containing sulfur and capable of donating the sulfur to a vulcanization reaction, e.g., disulfides and polysulfides.

The delayed action accelerators may be modified by retarders and activators which will respectively retard or activate the sulfur vulcanization. The addition of the retarder will further delay the time at which vulcanization occurs while the activator will cause vulcanization to occur sooner, e.g., shorter delay time.

The retarders suitable for use in the practice of this invention include organic compounds having a pKa of about 2 to less than 7; preferably about 3 to about 6.5; more preferably about 4 to about 6, e.g., 5. The term pKa is the dissociation constant as measured in aprotic solvents, see for example *Acid-Base Behavior in Aprotic Solvents* NBS Monograph 105, August 1968.

The activators suitable for use in the practice of this invention are metallic oxides, hydroxides and alkoxides of Group IA and Group IIA metals of the Periodic Table of Elements and organic compounds having a pKa of about 8 to about 14; preferably about 9 to about 12; more preferably about 9.5 to about 11, e.g., 10.

Illustrative examples of retarders are N-nitroso diphenylamine, N-cyclohexyl thiophthalimide, phthalic anhydride, salicylic acid, benzoic acid, etc. Generally, the preferred retarders are nitroso compounds, phthalimides, anhydrides and acids.

Illustrative examples of activators are MgO, diphenylguanidine, hexane-1-amine, 1,6-hexane diamine, sodium methoxide, etc. The preferred activators are guanidines and amines.

The retarders and activators are preferably incorporated into the polymer at about 0.1 to about 5 wt. %; more preferably about 0.25 to about 3.5 wt. %; most preferably about 0.5 to about 3.0 wt. %, e.g., 0.5 to about 2.5 wt. %. As it is well known in the elastomeric art, the copolymers and terpolymers of the instant invention can be readily extended with fillers and oils for further modification of the physical properties of the resultant articles of commerce.

The copolymers and terpolymers of the instant invention can be readily blended with other rubbers for modification of physical and chemical properties by techniques well known in the art. These other rubbers are selected from the group consisting of non-polar crystallizable rubbers (i.e. crystallization either deduced by low temperature or strain or a mixture thereof), polar crystallizable rubbers, non-polar non-crystallizable rubbers, and polar non-crystallizable rubbers. These rubbers are contained in the blend compositions at a concentration level of about 5 to about 95 parts by weight per 100 parts of the total rubber plus copolymer and/or terpolymer, more preferably about 10 to about 50 and most preferably about 10 to about 30. Typical, but non-limiting examples of each class are: non-polar crystallizable rubbers, natural rubber, low isoprene butyl rubbers having less than 1.0 mole percent isoprene, polar crystallizable rubbers-polychloroprene rubbers (i.e., the neoprene types), non-polar non-crystallizable rubbers-styrene butadiene copolymers, polybutadienes and butyl rubbers containing more than 1.0 mole percent isoprene; and polar non-crystallizable rubbers-styrene acrylonitrile copolymers.

The fillers employed in the present invention are selected from the group consisting of carbon blacks, silica, talcs, ground calcium carbonate, water precipitated calcium carbonate, or delaminated, calcined or hydrated clays and mixtures thereof. These fillers are incorporated into the blend composition at about 5 to about 350 parts by weight per hundred parts of polymer, more preferably at about 25 to about 350; and most preferably at about 50 to about 300. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85 and most preferably about 10 to about 75.

The compounding and plasticizer oils employed in the present invention are non-polar process oils having less than about 2 wt. % polar type compounds as measured by molecular type clay gel analysis. These oils are selected from paraffinics ASTM Type 104B as defined in ASTM-D-2226-70, aromatics ASTM Type 102 cr naphthenics ASTM Type 104A, wherein the oil has a flash point by the Cleveland open cup of at least 350° F., a pour point of less than 40° F., a viscosity of about 70 to about 3000 S.S.U.'s at 100° F. and a number average molecular weight of about 300 to about 1000, and more preferably about 300 to 750. The preferred process oils are paraffinics.

The oils are incorporated into the blend composition at a concentration level of about 5 to about 200 parts by weight per hundred parts of polymer; more preferably at about 25 to about 150, and most preferably at about 50 to about 150.

Other plasticizers suitable for use in the present invention are medium viscosity ester plasticizers for special high efficiency in increasing resilience particularly at low temperature. Some examples, which are not intended to be limiting in scope are dioctyl phthalate, dioctyl azelate, dioctyl sebacate or dibutyl phthalate. The ester plasticizer is incorporated into the blend composition at a concentration level of about 5 to about 100 parts by weight per hundred of polymer, more preferably about 5 to about 75, and most preferably about 5 to about 50.

Terpolymers of isoolefins, acyclic dienes and cyclodienes, e.g., isobutylene isoprene and methylcyclopentadiene possess markedly improved resistance to degradation by ozone over the acyclic diene copolymers. Although it has been postulated that such terpolymers would have such improved properties as a result of having the unsaturation located in a side chain rather than in the backbone, it has heretofore not been possible to prepare substantially gel-free isoolefin-cyclodiene terpolymers of high number average molecular weight even at low levels of unsaturation.

Utilizing the process of this invention, it is now possible to prepare such methylcyclopentadiene terpolymers having as little as 0.5 mole % unsaturation and as high as 45 mole % unsaturation. Preferably, the polymers contain about 5% to about 45% more preferably about 5 to about 40 mole % unsaturation, still more preferably 8 to about 40 mole %, and most preferably about 8 to about 30 mole %, e.g. about 12 to about 30 mole %.

As a result of the relatively lower reactivity of the unsaturation as compared to the isoprene copolymers, copolymers having incorporated therein about 2-4 mole % cyclopentadiene are about as reactive as butyl rubber having an isoprene content of about 0.5 to about 1.5 mole % and require ultra acceleration for sulfur vulcanization. By contrast the higher unsaturation copolymers, e.g., at least 5 mole %, preferably at least 8 mole %, may be sulfur vulcanized using the delayed action accelerator cure systems described above.

In general, the copolymers of this invention must not contain more than about 45 mole % unsaturation. Above about 45 mole % unsaturation, polymers prepared from acyclic multiolefins are intractable and unstable, e.g., gel on standing. Where the multiolefin is a cyclic multiolefin above 45 mole % unsaturation, the glass transition temperature of the polymer is too high. As a result, the polymers have poor low temperature characteristics. Preferably, the copolymers of this invention have about 5 to about 45 mole % unsaturation; more preferably about 5 to about 40 mole % still more preferably about 8 to about 40 and most preferably about 8 to about 30 mole %; e.g., 12 to about 30 mole %.

The permeability of isobutylene-isoprene copolymers increases exponentially with isoprene content—it decreases exponentially with cyclopentadiene content in isobutylene-cyclopentadiene copolymers—it is almost additive for terpolymers of isobutylene-isoprene cyclopentadiene. Thus the effect of the addition of one unit of isoprene to the isobutylene chain can be counteracted by the effect of addition of one unit of cyclopentadiene in the resultant impermeability value. Thus if the permeability of polyisobutylene (or the low isoprene unsaturates, i.e. the butyl rubbers) is found to be about $1 \times 10^{-8}$ (cm$^2$ sec$^{-1}$) under given test conditions, it will remain unchanged at isoprene/cyclopentadiene levels of 5/5, 10/10, 20/20 etc. If the ratio is changed e.g. to 10/20 then the permeability would resemble more the behavior of the predominate structure (i.e. cyclopentadiene). The reverse would hold for a ratio e.g. of 20/10.

Thus, the process of this invention permits the preparation of isoolefin copolymers and terpolymers, heretofore unattainable, which surprisingly retain all the advantageous characteristics of conventional low unsaturation butyl rubber while exhibiting improved vulcanization characteristics and in some cases, e.g. cyclodiene containing copolymers and terpolymers improved ozone resistance and air impermeability.

The term "substantially gel-free" as used in the specification and claims means copolymers containing less than 2 wt. % gel; more preferably less than 1% gel, e.g., ½% gel. The term "D#" where # is an integer means the volume % cyclopentadiene in a monomer mixture wherein D represents cyclopentadiene and the integer is the volume % diene.

DETAILED DESCRIPTION

The advantages of physical properties of the compositions of the present invention can be more readily appreciated by reference to the following examples and tables. Unless otherwise specified all measurements are in parts per hundred by weight.

EXAMPLE 1

A polymerization mixture consisting of 196 ml at −120° C. (137 g) isobutylene, 4 ml at −78° C. methylcyclopentadiene (MCPD) (3.52 g) and 50 ml at 25° C. (38.5 g) methylcyclohexane was stirred at −120° C. and 4 ml of a catalyst solution containing 1 g ethylaluminumdichloride per 100 ml methylcyclohexane solution was added. The polymerization temperature was maintained between −116° and −119° C. for 20 minutes at which point the polymerization was terminated by the addition of a small quantity of cold 10% propanol in pentane. The mixture was treated with gaseous ammonia and the copolymer coagulated from hot methanol containing an antioxidant. The product was dried in vacuo at about 60° C. yielding 10.1 g of a copolymer containing 25% methylcyclopentadiene and a number average molecular weight of 203,000.

EXAMPLE 2

According to the method of Example 1, a polymerization mixture of 200 ml isobutylene, 1 ml MCPD and 50 ml methylcyclohexane was polymerized for 15 minutes yielding 9.7 g of a copolymer containing 9.3% methylcyclopentadiene and a number average molecular weight of 310,000.

EXAMPLE 3

According to the method of Example 1, a mixture of 200 ml isobutylene, 2 ml methylcyclopentadiene and 50 ml methylcyclohexane was stirred at −100° C. and 4 ml of the catalyst solution was added. The temperature was maintained between −97° and −100° C. for 30 minutes. The isolated copolymer weighs 10 g and had a number average molecular weight of 190,000.

EXAMPLE 4

Example 3 was repeated using 1 ml of methylcyclopentadiene. The isolated copolymer weighed 9.8 g and had an Mn of 166,000.

EXAMPLE 5

According to the method of Example 1, a terpolymer was prepared from a mixture of 956 ml isobutylene 40 ml isoprene, 4 ml methylcyclopentadiene and 200 ml hexane. The mixture was stirred at −100° C. and 20 ml of the catalyst solution added. The temperature was maintained between −98° and −100° C. for 30 minutes. The isolated product weighed. 12.4 g.

Since many modifications and variations of this invention may be made without departing from the spirit or scope of the invention thereof, it is not intended to limit the spirit or scope thereof to the specific examples thereof.

The practice of this invention can involve batch or continuous polymerizations either isothermal or multi-temperature. Continuous polymerization is preferred since it is more convenient for commercial operation and gives more uniform (homogeneous) products. Molecular weight distributions (Mw/Mn) are preferably between 2.0 and 20.

What is claimed is:

1. The vulcanizable composition which comprises:
   (a) a major portion of a substantially gel-free polymer consisting essentially of an isoolefin having about 5 to about 10 carbon atoms and about 5 to about 45 mole % of a conjugated diolefin being methylcyclopentadiene, said polymer having a number average molecular weight of at least 120,000;
   (b) a vulcanizing amount of a sulfur donor; and
   (c) a delayed action accelerator.

2. The composition of claim 1, wherein said polymer includes a second conjugated diene being selected from the group consisting of isoprene, piperylene, 2-3 dimethyl butadiene, 2-5 dimethyl hexadi-2,4-ene, cyclopentadiene and cyclohexadiene, and mixtures thereof.

3. The composition of claim 1, wherein the isoolefin is isobutylene.

4. The composition of claim 2, wherein the isoolefin is isobutylene.

5. The composition of claim 1, wherein the isoolefin is isobutylene and the diene comprises a blend of methylcyclopentadiene as a first diene and a second diene.

6. The composition of claim 5, wherein the second diene is isoprene or piperylene.

7. The composition of claim 5, wherein the second diene is cyclopentadiene.

8. The composition of claim 1, wherein the polymer comprises at least 5 mole % methylcyclopentadiene.

9. The composition of claim 3, wherein the diene content is about 5 to about 40 mole %.

10. The composition of claim 3, wherein the diene content is about 8 to about 40 mole %.

11. The composition of claim 3, wherein the diene content is about 8 to about 30 mole %.

12. The composition of claim 5, wherein the methylcyclopentadiene is at about 5 to about 45 mole %.

13. The composition of claim 5, wherein the methylcyclopentadiene is at about 8 to about 40 mole %.

14. The composition of claim 5, wherein the methylcyclopentadiene is at about 8 to about 30 mole %.

15. The composition of claim 1, wherein the delayed action accelerator is a benzothiazole sulfenamide present at about 0.5 to about 3 wt. % based on the polymer.

16. The composition of claim 1, wherein a retarder having a pKa value of less than 7 is incorporated therein.

17. The composition of claim 1, wherein an activator is included said activator being selected from the group consisting of:
   (1) oxides, hydroxides and alkoxides of metals of Groups IA and IIA of the Periodic Table of Elements; and
   (2) organic compounds having a pKa value of about 8 to about 14.

18. The composition of claim 16, wherein the retarder has a pKa value of about 3 to about 5.

19. The composition of claim 1, wherein the delayed action accelerator is N,N-diethylbenzothiazole-2-sulfenamide, N-tertiary butyl benzothiazole-2-sulfenamide, 2-(morpholino) benzothiazole-2-sulfenamide, N,N-diisopropyl benzothiazole-2-sulfenamide, N-cyclohexyl benzothiazole-2-sulfenamide, N,N-dicyclohexyl benzothiazole-2-sulfenamide, 2(2,6 dimethyl morpholino) benzothiazole sulfenamide or 2-piperidinyl benzothiazole sulfenamide.

20. The composition of claim 16, wherein the retarder is N-nitroso diphenylamine, N-cyclohexyl thiophthalimide, phthalic anhydride or salicylic acid.

21. The composition of claim 17, wherein the activator is diphenylguanidine, hexane-1-amine, sodium methoxide or MgO.

22. The composition of claim 1, wherein a retarder is included.

23. The composition of claim 1, further including a filler at about 5 to about 350 parts by weight per one hundred parts of said polymer.

24. The composition of claim 1, further including a non-polar process oil at about 5 to about 200 parts by weight based on one hundred parts of said polymer.

25. The composition of claim 24, further including a filler at about 5 to about 350 parts by weight per one hundred parts of said polymer.

26. The composition of claim 1, further including an ester plasticizer at a concentration level of about 5 to about 100 parts by weight per one hundred parts of said polymer.

27. The composition of claim 26, further including a filler at about 5 to about 350 parts by weight per one hundred parts of said polymer.

28. The composition of claim 1, further including a rubber at a concentration level of about 5 to about 95 parts by weight per one hundred parts of the total of said polymer and said rubber, said rubber being selected from the group consisting of non-polar crystallizable rubbers, polar crystallizable rubbers, non-polar non-crystallizable rubbers, and polar non-crystallizable rubbers.

29. The composition of claim 28, further including a filler.

30. The composition of claim 29, including an oil.

31. The composition of claim 28, including an oil.

* * * * *